(12) United States Patent
Werner

(10) Patent No.: US 7,617,165 B2
(45) Date of Patent: Nov. 10, 2009

(54) SYSTEMS AND METHODS FOR STORING A PATTERN OCCURRING IN SITUATION REPRESENTATIONS FOR CONTEXT REPRESENTATION IN AN APPLICATION

(75) Inventor: Horst Werner, Rettigheim (DE)

(73) Assignee: SAP AG, Walldorf (DE)

( * ) Notice: Subject to any disclaimer, the term of this patent is extended or adjusted under 35 U.S.C. 154(b) by 405 days.

(21) Appl. No.: 11/048,702

(22) Filed: Feb. 3, 2005

(65) Prior Publication Data
US 2005/0216438 A1 Sep. 29, 2005

(30) Foreign Application Priority Data
Feb. 3, 2004 (EP) .................................. 04075323

(51) Int. Cl.
*G06N 5/00* (2006.01)
(52) U.S. Cl. .......................................... 706/20; 706/45
(58) Field of Classification Search .................... 702/20, 702/47, 45
See application file for complete search history.

(56) References Cited

U.S. PATENT DOCUMENTS

| | | | |
|---|---|---|---|
| 7,152,075 B2 * | 12/2006 | Vining et al. ............. | 707/104.1 |
| 2002/0107841 A1 * | 8/2002 | Hellerstein et al. ............. | 707/3 |
| 2002/0165842 A1 * | 11/2002 | Hellerstein et al. ............. | 706/47 |
| 2003/0023593 A1 * | 1/2003 | Schmidt ......................... | 707/6 |
| 2004/0138846 A1 * | 7/2004 | Buxton et al. ................ | 702/108 |

OTHER PUBLICATIONS

Strauss, Friedrich, "Contextsensitive Help-facilities in GUIs through Situations," Springer-Verlag, Berlin, Germany, 1993, pp. 79-90.
Communication and Search Report from the European Patent Office, dated Jul. 15, 2004 (8 pages).

* cited by examiner

*Primary Examiner*—Wilbert L Starks, Jr.
(74) *Attorney, Agent, or Firm*—Finnegan, Henderson, Farabow, Garrett & Dunner, LLP

(57) ABSTRACT

Systems and methods are provided for storing a pattern occurring in situation representations for context representation in an application. A system stores a pattern occurring in situation representations for context representation in an application. The system includes a first storage medium for storing a plurality of situations in which the user is or has been involved, as a respective plurality of situation representations having at least one property determined by the respective situation. The system also includes a pattern identifier for identifying a pattern including a common property shared by at least two of the plurality of situation representations in the plurality of stored situation representations. The system further includes a second storage medium for storing a representation of the pattern. The first storage medium is arranged to remove the at least two of the plurality of situation representations from the first storage medium in response to the identification of the pattern.

31 Claims, 3 Drawing Sheets

SYSTEMS AND METHODS FOR STORING A PATTERN OCCURRING IN SITUATION REPRESENTATIONS FOR CONTEXT REPRESENTATION IN AN APPLICATION

This application is based upon and claims the benefit of priority from prior patent application EP 04075323.8, filed Feb. 3, 2004, the entire contents of which are expressly incorporated herein by reference.

BACKGROUND

I. Technical Field

The present invention relates to a system for storing a pattern occurring in situation representations for a context representation in an application and a method of storing a pattern occurring in situation representations for a context representation in an application.

II. Background Information

Applications, such as business applications, allow the user to work in different contexts. Such applications adapt the information displayed, and the actions or objects, which the user may select, according to a respective context. However, the context is not explicitly modeled. Instead, it is implicitly given by the various screens of an application's user interface. Limited context information is kept when the user switches to another screen. While some applications use lists of recently or frequently used objects, the relationship of these objects with respect to the user's activities is unknown to the application.

Therefore, conventional applications frequently provide context information that is poor and unavailable for generic algorithms and the context sensitivity must be hard coded for each screen. Embodiments consistent with the present invention address these problems encountered with conventional applications. In particular, embodiments consistent with the present invention improve a context representation in the application while keeping the data to be handled to a minimum.

SUMMARY

Consistent with the present invention, a system is provided for storing a pattern occurring in situation representations for a context representation in an application. The system comprises a first storage medium for storing a plurality of situations in which the user is or has been involved, as a plurality of situation representations having at least one property determined by the respective situation; a pattern identifier for identifying a pattern, including a common property shared by at least two of the plurality of situation representations in the plurality of stored situation representations; and a second storage medium for storing a representation of the pattern, wherein the first storage medium is arranged to remove the at least two of the plurality of situation representations from the first storage medium in response to the identification of the pattern.

Also consistent with the present invention, a method is provided for storing a pattern occurring in situation representations for context representation in an application. The method comprises storing in a first storage medium a plurality of situations in which the user is or has been involved, as a respective plurality of situation representations having at least one property determined by the respective situation; identifying a pattern including a common property shared by at least two of the plurality of situation representations in the plurality of stored situation representations; and storing in a second storage medium a representation of the pattern, wherein the first storage medium is arranged to remove the at least two of the plurality of situation representations from the first storage medium in response to the identification of the pattern.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

Figure 1:
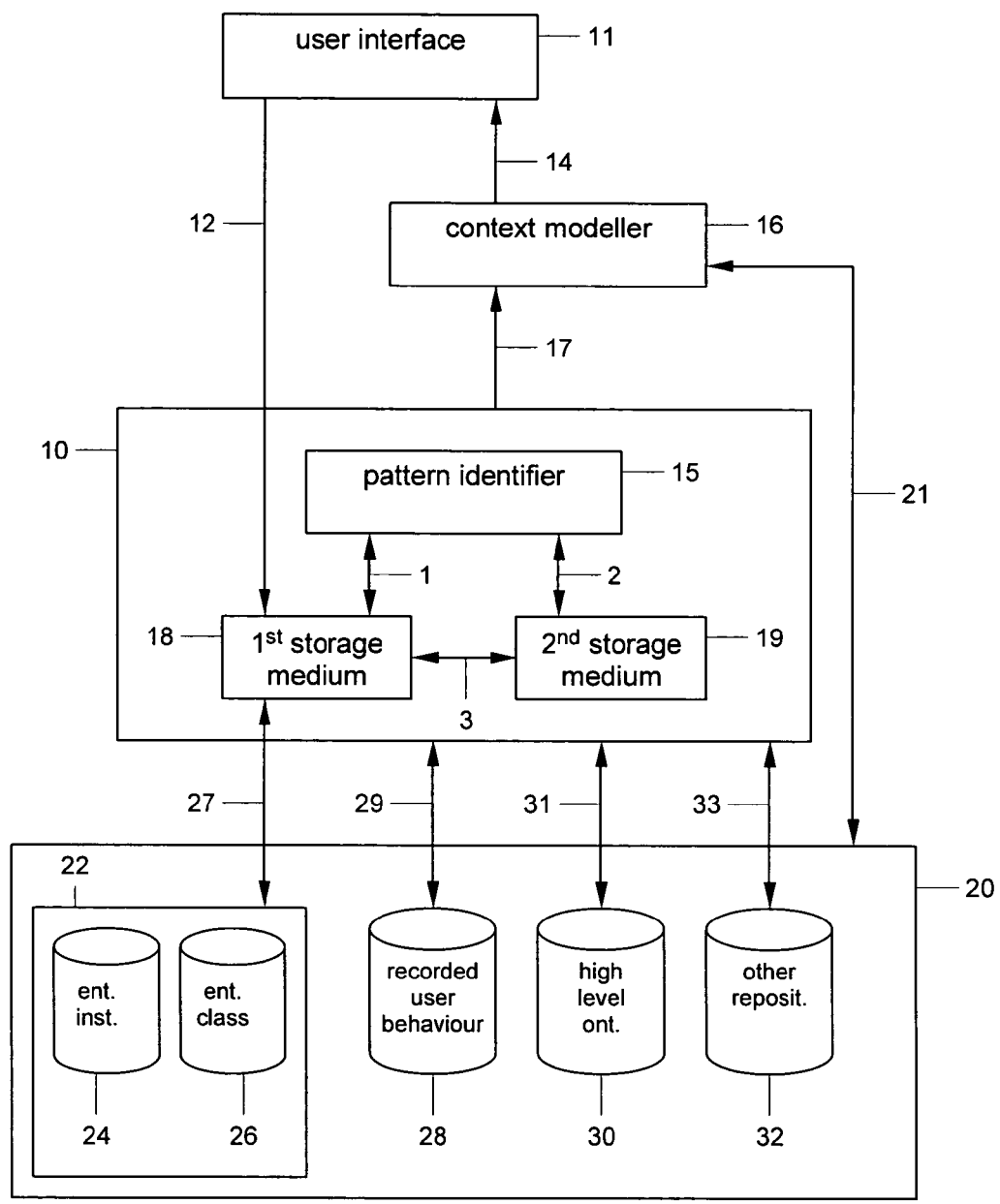
FIG. 1 shows an architecture incorporating an embodiment consistent with the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding steps to the disclosed methods. Accordingly, the following detailed description does not limit the invention. Instead, the proper scope of the invention is defined by the appended claims.

Figure 2:
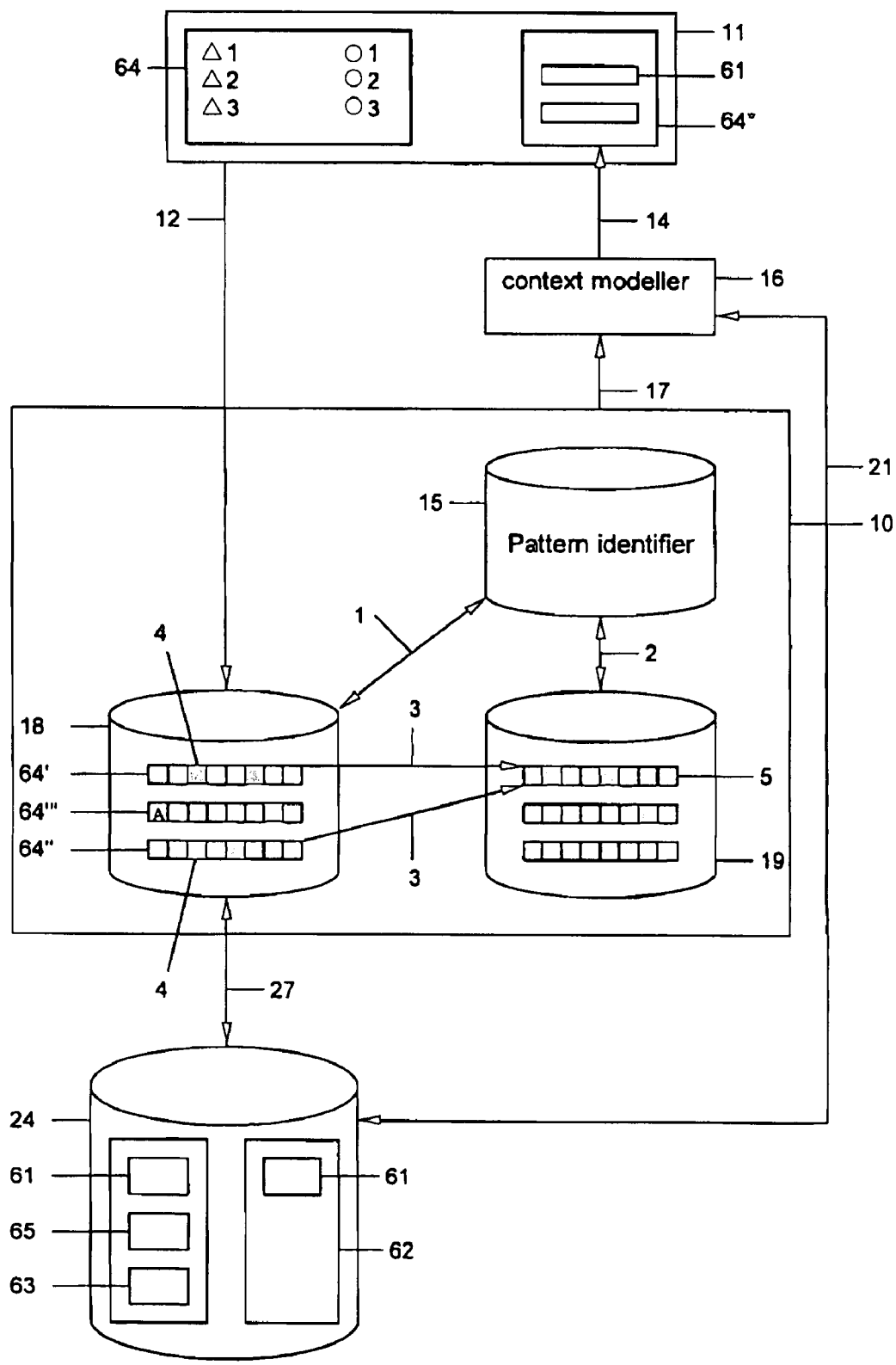
FIG. 2 shows aspects of the architecture shown in FIG. 2 in further detail.

FIG. 1 shows an architecture incorporating an embodiment consistent with the present invention. FIG. 2 shows aspects of the architecture shown in FIG. 1 in further detail. With reference to FIGS. 1 and 2, a system 10 is shown on which the process described hereinafter may be implemented. In particular, the data flow and data processing steps initiated by the system of an embodiment consistent with the present invention are shown in FIGS. 1 and 2. System 10 stores a pattern occurring in situation representations 64' for context representation 64* in an application 20. The system includes a first storage medium 18 for storing a plurality of situations 64 in which the user is or has been involved, as a respective plurality of situation representations 64' having at least one property 4 determined by the respective situation 64; a pattern identifier 15 for identifying a pattern including a common property 4 shared by at least two of the plurality of situation representations 64', 64" in the plurality of stored situation representations 64' 64"; and a second storage medium 19 for storing a representation of the pattern 5, wherein the first storage medium 18 is arranged to remove the at least two of the plurality of situation representations 64', 64" from the first storage medium 18 in response to the identification of the pattern.

System 10 is associated with a context modeler 16. System 10 may typically be associated with a user interface 11 with which a user interacts. Typically, at any one time the user is involved in a situation 64 that may include an action or a process or both. System 10 is also typically associated with an application 20, that may include a database 22 that may form part of a business application. Situation 64 is defined by at least one of an action and process and is input 12 to the first storage medium 18 where it is stored as a situation representation 64', 64". The situation representation 64', 64" is created by system 10 on the basis of data from the application 20 and depending on the circumstances the current context representation which may be stored in context modeler 16.

Data may be exchanged 12, 14 between the user interface 11 and the system 10. In particular, context modeler 16 and system 10 are arranged to exchange 17 data. Further, context modeler 16 may be arranged to exchange data with the application 20. Context modeler 16 determines which entities 61 are to form the context representation 64\* on the basis of, among other things, the output of system 10. The context representation 64\* typically includes at least one entity 61. The context of an entity or a situation as defined by the process or action is a collection of facts and entities 61 which are of special importance for that entity or situation and which usually have a direct or indirect relationship to the entity or situation. Within a business application, such as a business application in which a database is provided, a context may be defined for a variety of entities 61 or a situation 64 including, but not limited to a user, a session or a business entity. For a user, the context may include entities 61 including his role, projects, or personal preferences. For a session the context may include entities 61 including a user, last actions, or manipulated business entities 61. For a certain business object of the business application, the context may include entities 61 including past projects, or orders for a customer. A business object is typically an entity 61 stored in a database 22. Technically, context may be represented by a number of instances of business entities 61, processes/actions, or situations. A situation 64 may be defined by at least one or a process or action.

Typically, as seen in FIG. 2, a user is involved with procedures that may include processes and/or actions shown by triangle 1, 2, 3 and circle 1, 2, 3. The procedures give rise to a situation 64. The context modeler 16 models the context in response to the situation using situation and pattern representations 5, 64', 64", 64'" stored in the system 10. According to the present invention, representations of a situation in which the user has been involved are stored in the first storage medium 18. They may be stored in terms of the entities 61 involved or associated with each particular process and/or action as a frame. The current and previous situations may be represented by a number of frames describing objects or actions involved in the situation and their relationship to each other. A frame is a term, known to the skilled person for example, from artificial intelligence (AI), and represents a common pattern that occurs with different "actors" in fixed "roles". The frame comprises slots, wherein the roles are represented by the slots and the slots are filled with the actors in a specific instance of such a frame. In particular, with reference to the present invention entities 61 form the contents of the slot. In particular, the frame is a data-structure for representing a current or previous situation. In other words, it is a representation of a pattern. In general terms, a frame may be compared to a "class" in object oriented programming (OOP). In one embodiment, the pattern represented by the frame can represent a single situation. Alternatively, the pattern represented by the frame may also be the essence of a large number of single situations. Therefore, the relations referring to the respective entities in the slots may carry various values. For example, the relations referring to the respective entities may carry a value indicating at least one of the probability and reliability of that relation. Further, another value can be set to characterize the importance of the respective relation in that situation. Also, these relations can be marked as causal or dependent relations, respectively. While the causal relations characterize a situation, the dependent relations may be considered as the deduction.

The frames, relations and values for at least one of the situations the user has been involved with together with the current situation are stored in the first storage medium 18. In other words, the user's behavior is observed by the system 10 and stored as frames. This data may then be used by context modeler 16 to model the context representation 64\*. This approach ensures a seamless integration of predefined and learned rules for evaluation purposes.

In this way, the context representation modeled by the context modeler 16 on the basis of system 10 not only represents the application contents but also the observed user behavior including the current situation. It has been found that storing all situations 64 as situation representations 64', 64" involves the storage and handling of large amounts of data. To address this problem, pattern identifier 15 is provided. Pattern identifier 15 identifies patterns in the situation representations 64', 64", 64'" stored in the first storage medium 18. In particular, a pattern identifier 15 identifies at least two situation representations 64', 64" sharing a common property 4. If a pattern is identified, a pattern representation 5 is created and stored in the second storage medium 19. Once the pattern has been identified, the situation representations 64', 64" associated with the pattern are removed from the first storage medium 18. In this way, the amounts of data to be handled are reduced. Preferably, the first storage medium 18 is a short term memory and the second storage medium 19 is a long term memory. The situation representations 64',64", 64'" and pattern representations 5 may be stored as frames. The frames in the long term memory are abstractions of many frames which have been in the short term memory before. In a further embodiment, the system 10 is arranged to identify whether a situation 64 has been encountered before. In particular, if the system 10 identifies that the situation has not been encountered before, the situation 64 is stored in the first storage medium 18 as a situation representation 64'", and the system 10 is arranged to determine whether the situation representation 64'" fits the pattern representation 5. In a further embodiment, if the situation representation 64'" deviates from the pattern representation 5 or cannot be matched with the pattern representation 5, the system 10 is arranged to assign an activation value A to the situation representation 64'" causing the duration of the storage of the situation representation in the first storage medium 18 to be extended.

In other words, whenever a new situation occurs, it is put in the short term memory and the system determines whether it fits to some pattern representation in the long term memory. If so, an assignment is made and certain expectations can be verified. If the situation deviates from the expected pattern or cannot be matched from the beginning with a higher activation value, it is assigned to it in the short term memory. It will thus stay longer than the more trivial situations in the short term memory. Intermittently, the system 10 may find common properties of patterns in the short term memory. In this way, the pattern are identified promptly in order to reduce the volume of data stored in promptly. This further improves the efficiency of the system. To identify patterns, abstraction may be used.

In another embodiment, pattern identifier 15 is arranged to perform an abstraction with respect to a plurality of properties 4 to determine an abstract pattern. Yet further, the second storage medium 19 may be arranged to store an abstract pattern representation corresponding to the abstract pattern. In other words, if a pattern or patterns are identified with common properties, the abstract pattern is moved 3 over to the long term memory 19 where it is stored as a pattern representation 5. The identification of which relations are causal and which are dependent may be performed, for example. If a pattern of relations A, B, C is found, A and B are identified as being causal if there is no situation of A, B, not C.

In another embodiment, pattern identifier 15 is arranged to identify the pattern if a number of situation representations 64', 64" with at least one common property 4 exceed a first threshold value. The first threshold value may be defined by the system or the user. Similarly, in a further embodiment, pattern identifier 15 is arranged to identify the pattern if a number of common properties 4 shared by the at least two situation representations 64', 64" exceeds a second threshold value. As mentioned, in a further embodiment, the plurality of situation representations 64', 64" is stored as a respective plurality of frames describing at least one entity and action involved in the respective situation 64 and their relationship to each other. Similarly, the pattern may also be stored as a frame representation. As mentioned, in a further embodiment, the frame storing the pattern is an abstraction of the plurality of frames corresponding to the at least two of the plurality of situation representations 64', 64" sharing a common property.

In another embodiment consistent with the present invention, system 10 determines which elements of the current context are to be included in the situation 64. This is achieved by defining an activation threshold and defining a situation as being a set of entities in the current context having an activation above that threshold. In this way, the situation representation reflects the current context.

In a typical relational database 22, a plurality of entities are stored in a plurality of tables in accordance with their entity type. In order for entities from different tables to be included in the context representation modeled by context modeler 16, the first and second storage media 18, 19 may store a uniform representation of the entities from different tables.

In another embodiment, the first and second storage media 18, 19 include a semantic net representation which, in addition to providing a uniform representation, stores the relations between the different entity types. In an embodiment, the first and second storage media 18, 19 are semantic net servers. If a semantic net server is used, the relations between the representations of the processes and actions are included. A semantic net is a data structure made up of nodes and relations between those nodes. The nodes represent terms and they are embedded in an abstraction hierarchy by means of the special relation type "is a". A semantic net is the common way of representing ontologies in a computer system. Representations of processes and actions can be integrated in the semantic net structure as well as a general knowledge ontology. It is noted that an ontology is an explicit specification of a conceptualization. A conceptualization is an abstract, simplified view of the world it is desired to represent for some purpose. An ontology contains the vocabulary (terms or labels) and the definition of the concepts and their relationships for a given domain. An ontology is a representation that exists independent of any computer models or implementations. As mentioned, context modeler 16 uses the patterns stored in the system 10 to identify the context representation 64* from the pattern representations 5 and situation representations 64', 64".

In FIG. 1, a business application 20 is shown. A first data repository entity 24 stores instances. A second data repository 26 stores entity classes. The business application 20 further includes a recorded user behavior storage medium 28 for storing user behavior, a high level ontology storage medium 30 for storing a high level ontology and other repositories 32 for storing other data. Database 22, recorded user behavior storage medium 28, high level ontology storage medium 39, and other repositories 32 may exchange data with system 10 via communication links 27, 29, 31, and 33, respectively. In particular, in order to provide data concerning entities for the situation representations 64', 64", 64'".

In the example, one database is shown. The invention is not limited in this respect since system 10 may be arranged to store situation representations and pattern representations from at least one database. For example, a plurality of databases may be influenced by the context representation modeled by the context modeler 16.

Figure 3:
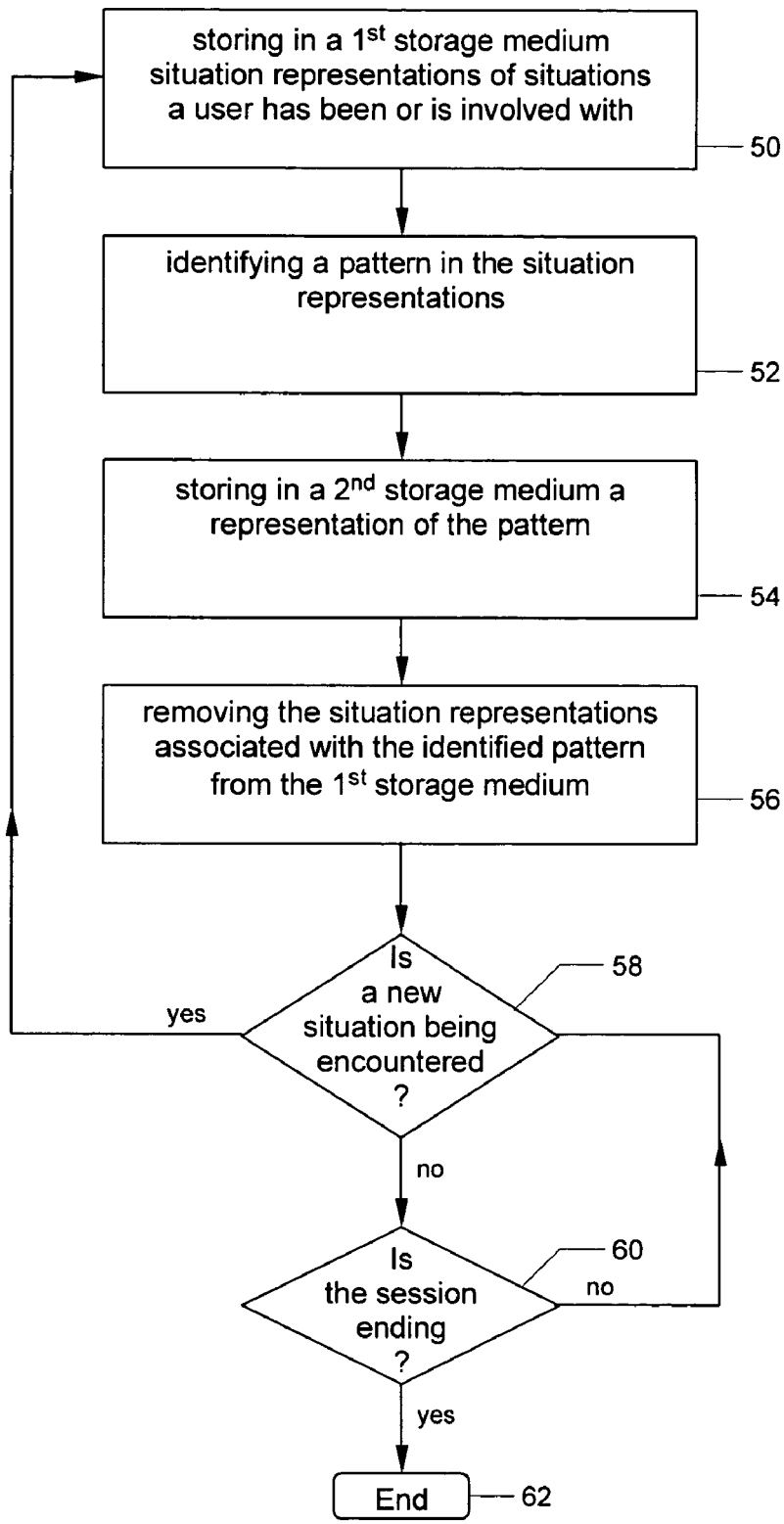
FIG. 3 shows a flow diagram incorporating a method of managing a database in accordance with an embodiment consistent with the present invention.

FIG. 3 shows a flow diagram incorporating a method of modeling a context representation in accordance with an embodiment consistent with the present invention. As can be seen, a process 200 is shown including the steps of: storing in a first storage medium situation representations of situations a user has been or is involved with (step 50), identifying a pattern in the situation representations (step 52), storing in a second storage medium a representation of the pattern (step 54), removing the situation representations associated with the identified pattern from the first storage medium (step 56). Subsequently, the system determines whether a new situation is being encountered. If it is, the process returns to step 50, if it is not, the system determines if the session is ending (step 60), if it is not, the process returns to step 58, if the session is ending, the process ends (step 62).

In a particular embodiment consistent with the present invention, there is provided a method of storing a pattern occurring in situation representations for context representation in an application, the method comprising the steps of: storing in a first storage medium 18 a plurality of situations 64 in which the user is or has been involved, as a respective plurality of situation representations 64', 64" having at least one property 4 determined by the respective situation 64, identifying a pattern including a common property 4 shared by at least two of the plurality of situation representations 64', 64" in the plurality of stored situation representations 64', 64", and storing in a second storage medium 19 a representation 5 of the pattern, wherein the first storage medium 18 is arranged to remove the at least two of the plurality of situation representations 64', 64" from the first storage medium 18 in response to the identification of the pattern.

Another embodiment stores the situation representations 64', 64" in the first storage medium 18 for a short term duration. Yet another embodiment stores the pattern representation 5 in the second storage medium 19 for a long term duration. In yet another embodiment, the pattern is identified if a number of situation representations 64', 64" with at least one common property 4 exceeds a first threshold value. Similarly, another embodiment includes identifying the pattern if a number of common properties 4 shared by the at least two situation representations 64', 64" exceeds a second threshold value.

Still yet another embodiment stores the plurality of situation representations 64', 64" as a respective plurality of frames describing at least one entity 61 and action involved in the respective situation 64 and their relationship to each other. The method may further include storing the pattern as a frame representation. Furthermore, the method may include abstracting the plurality of frames corresponding to the at least two of the plurality of situation representations 64', 64" sharing a common property to determine the frame representation of the pattern.

Another embodiment identifies whether a situation 64 has been encountered before. If the system 10 identifies that the situation 64 has not been encountered before, situation 64 may be stored in the first storage medium 18 as a situation representation 64'", and it is determined whether the situation representation 64'" fits the pattern representation 5.

Another embodiment includes determining if the situation representation 64'" deviates from the pattern representation 5 or cannot be matched with the pattern representation 5, and, if so, assigning an activation value A to the situation representation 64'" causing the duration of the storage of the situation representation in the first storage medium 18 to be extended. Another embodiment includes intermittently identifying the pattern. Still yet another embodiment includes performing an abstraction with respect to a plurality of properties 4 to determine an abstract pattern linking those properties. For example, a first statement "A has a dog" and the second statement "B has a cat" are not linked by any common property. However, an abstraction can be used to identify the common property "A and B each have a pet." The method may include storing in the second storage medium 19 an abstract pattern representation corresponding to the abstract pattern. In particular, the method may include defining an activation threshold and defining the situation representation for a respective situation 64 as being a set of entities in a current context representation 64* having an activation value above the activation threshold.

In embodiments consistent with the present invention, situation representations are stored in the first storage medium 18 and pattern representations are stored in a second storage medium. It will be understood that the first and second storage media may form part of the same storage medium or, alternatively, separate storage media. The invention is not limited with respect to the storage medium or media required, in particular, the arrangement any particular storage medium or media.

Embodiments consistent with the present invention have application to a user terminal comprising means operable to perform any of the methods described. The present invention has application to a program storage device readable by a processing apparatus, said device embodying a program of instructions executable by the processor to perform the steps of any one of the methods described.

Embodiments as described can be implemented in digital electronic circuitry, or in computer hardware, firmware, software, or in combination thereof. An apparatus according to the present invention can be implemented in a computer program product tangibly embodied in a machine readable storage device for execution by a programmable processor; and method steps of the invention can be performed by a programmable processor executing a program of instructions to perform functions of the invention by operating on input data and generating output. The invention can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Typically, a processor will receive instructions and data from a read-only memory and/or a random access memory. Typically, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example, semiconductor memory devices, such as EEPROM, and flash memory devices; magnetic disks such as internal hard disks and removable disks; magneto-optical disks; and CD-ROM disks. Any of the foregoing can be supplemented by, or incorporated in ASICs (application specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

While certain features and embodiments of the invention have been described, other embodiments of the invention will be apparent to those skilled in the art from consideration of the specification and practice of the embodiments of the invention disclosed herein. Further, the steps of the disclosed methods may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed is:

1. A system for storing a pattern occurring in situation representations for a context representation in an application, the system comprising:
   a first storage medium for storing representations of situations in which a user is or has been involved, as a plurality of situation representations, each situation representation including at least one property of the respective situation;
   a pattern identifier for identifying patterns in the representations of situations, wherein a pattern is identified when a property is shared by at least two of the plurality of stored situation representations;
   a second storage medium for storing, after the patterns are identified by the pattern identifier, representations of the identified patterns, wherein the first storage medium removes the at least two situation representations from the first storage medium in response to the identification of the pattern; and
   a context modeller for modelling the context representation from the stored situation representations and the identified patterns.

2. The system according to claim 1, wherein the first storage medium is a short term memory.

3. The system according claim 1, wherein the second storage medium is a long term memory.

4. The system according to claim 1, wherein the plurality of situation representations is stored as a respective plurality of frames describing at least one entity and action involved in the respective situation and their relationship to each other.

5. The system according to claim 1, wherein the pattern is stored as a frame representation.

6. The system according to claim 5, wherein the frame storing the pattern is an abstraction of the plurality of frames corresponding to the at least two of the plurality of situation representations sharing a common property.

7. The system according to claim 1, wherein the system is arranged to identify whether a situation has been encountered before.

8. The system according to claim 7, wherein if the system identifies that the situation has not been encountered before, the situation is stored in the first storage medium as a situation representation, and the system determines whether the situation representation fits the pattern representation.

9. The system according to claim 8, wherein if the situation representation deviates from the pattern representation or cannot be matched with the pattern representation, the system assigns an activation value to the situation representation causing the duration of the storage of the situation representation in the first storage medium to be extended.

10. The system according to claim 8, wherein the pattern identifier is arranged to intermittently identify the pattern.

11. The system according to claim 8, wherein the pattern identifier is arranged to perform an abstraction with respect to a plurality of properties to determine an abstract pattern.

12. The system according to claim 11, wherein the second storage medium is arranged to store an abstract pattern representation corresponding to the abstract pattern.

13. The system according to claim 12, wherein the system is arranged to define an activation threshold and is arranged to define the situation representation for a respective situation as being a set of entities in a current context representation having an activation value above the activation threshold.

14. The system according claim 1, wherein the pattern identifier is arranged to identify the pattern if the number of situation representations with at least one common property exceeds a first threshold value.

15. The system according to claim 14, wherein the pattern identifier is arranged to identify the pattern if a number of common properties shared by the at least two situation representations exceeds a second threshold value.

16. A computer-implemented method of storing a pattern occurring in situation representations for context representation in an application, the method comprising the steps, performed by a computer, of:
    storing in a first storage medium representations of situations in which a user is or has been involved, as a plurality of situation representations, each situtation representation including at least one property of the respective situation;
    identifying, using a processor, patterns in the representations of situations, wherein a pattern is identified when a property is shared by at least two of the plurality of stored situation representations;
    storing in a second storage medium, after the patterns are identified by the pattern identifier, representations of the identified patterns, wherein the first storage medium removes the at least two situation representations from the first storage medium in response to the identification of the pattern; and
    a context modeller for modelling the context representation from the stored situation representations and the identified patterns.

17. The computer-implemented method according to claim 16, further comprising:
    storing the situation representations in the first storage medium for a short term duration.

18. The computer-implemented method according to claim 16, further comprising:
    storing the pattern representation in the second storage medium for a long term duration.

19. The computer-implemented according to claim 16, further comprising:
    storing the plurality of situation representations as a respective plurality of frames describing at least one entity and action involved in the respective situation and their relationship to each other.

20. The computer-implemented method according to claims 16, further comprising:
    storing the pattern as a frame representation.

21. The computer-implemented method according to claim 20, further comprising:
    abstracting the plurality of frames corresponding to the at least two of the plurality of situation representations sharing a property to determine the frame representation of the pattern.

22. The computer-implemented method according to claim 16, further comprising:
    identifying whether a situation has been encountered before.

23. The computer-implemented method according to claim 22, wherein if the system identifies that the situation has not been encountered before, storing the situation in the first storage medium as a situation representation, and determining whether the situation representation fits the pattern representation.

24. The computer-implemented method according to claim 23, further comprising:
    determining if the situation representation deviates from the pattern representation or cannot be matched with the pattern representation, and, if so, assigning an activation value to the situation representation causing the duration of the storage of the situation representation in the first storage medium to be extended.

25. The computer-implemented method according to claim 16, further comprising:
    intermittently identifying the pattern.

26. The computer-implemented method according to claim 16, further comprising:
    performing an abstraction with respect to a plurality of properties to determine an abstract pattern.

27. The computer-implemented method according to claim 26, further comprising:
    storing in the second storage medium an abstract pattern representation corresponding to the abstract pattern.

28. The computer-implemented method according to claim 16, further comprising:
    defining an activation threshold and defining the situation representation for a respective situation as being a set of entities in a current context representation having an activation value above the activation threshold.

29. The computer-implemented method according to claim 16, further comprising: identifying the pattern if the number of situation representations with at least one common property exceeds a first threshold value.

30. The computer-implemented method according to claim 29, further comprising:
    identifying the pattern if a number of common properties shared by the at least two situation representations exceeds a second threshold value.

31. A program storage device readable by a processing apparatus, the device embodying a program of instructions executable by the processor to perform a computer-implemented method, the computer-implemented method comprising:
    storing in a first storage medium representations of situations in which a user is or has been involved, as a plurality of situation representations, each situtation representation including at least one property of the respective situation;
    identifying, using the processing apparatus, patterns in the representations of situations, wherein a pattern is identified when a property is shared by at least two of the plurality of stored situation representations;
    storing in a second storage medium, after the patterns are identified by the pattern identifier, representations of the identified patterns, wherein the first storage medium removes the at least two situation representations from the first storage medium in response to the identification of the pattern; and
    a context modeller for modelling the context representation from the stored situation representations and the identified patterns.

* * * * *

UNITED STATES PATENT AND TRADEMARK OFFICE
CERTIFICATE OF CORRECTION

PATENT NO. : 7,617,165 B2  Page 1 of 1
APPLICATION NO. : 11/048702
DATED : November 10, 2009
INVENTOR(S) : Horst Werner It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 584 days.

Signed and Sealed this

Nineteenth Day of October, 2010

David J. Kappos
*Director of the United States Patent and Trademark Office*